(12) United States Patent
Hashimoto et al.

(10) Patent No.: US 8,519,352 B1
(45) Date of Patent: Aug. 27, 2013

(54) RADIATION MONITOR AND HAND-FOOT CLOTH MONITOR INCLUDING HAND MONITORING UNIT

(75) Inventors: Tadao Hashimoto, Hino (JP); Hideyuki Norimatsu, Hachioji (JP); Daisuke Inui, Hachioji (JP)

(73) Assignee: Fuji Electric Co., Ltd., Kawasaki-Shi (JP)

( * ) Notice: Subject to any disclaimer, the term of this patent is extended or adjusted under 35 U.S.C. 154(b) by 0 days.

(21) Appl. No.: 13/138,550

(22) PCT Filed: Oct. 21, 2010

(86) PCT No.: PCT/JP2010/068597
§ 371 (c)(1), (2), (4) Date: Oct. 18, 2011

(87) PCT Pub. No.: WO2012/053088
PCT Pub. Date: Apr. 26, 2012

(51) Int. Cl.
*G01J 1/42* (2006.01)
*G01T 1/00* (2006.01)

(52) U.S. Cl.
USPC .......................... 250/394; 250/366; 250/367

(58) Field of Classification Search
USPC ......................................... 250/394, 366, 367
See application file for complete search history.

(56) References Cited

U.S. PATENT DOCUMENTS

| | | | | |
|---|---|---|---|---|
| 4,253,025 A | * | 2/1981 | Fergus | 250/385.1 |
| 4,352,019 A | * | 9/1982 | Pollard | 250/394 |
| 4,862,005 A | * | 8/1989 | Johnson et al. | 250/385.1 |

FOREIGN PATENT DOCUMENTS

| | | |
|---|---|---|
| JP | H04-184289 | 7/1992 |
| JP | H07-012946 | 1/1995 |
| JP | 2003-167059 | 6/2003 |

OTHER PUBLICATIONS

Title: Thermo Scientific, Data: Aug. 2009, Publisher: Thermo Scientific.*

* cited by examiner

*Primary Examiner* — David Porta
*Assistant Examiner* — Taeho Jo
(74) *Attorney, Agent, or Firm* — Manabu Kanesaka

(57) ABSTRACT

A radiation monitor and a hand-foot-cloth monitor include a hand monitoring unit capable of accurately measuring surface contamination regardless of the size of the hand of the examinee. A hand monitoring unit (7A) includes a fixed detecting unit (73a) and a movable detecting unit (72a) arranged to face the fixed detecting unit (73a) and movable reciprocatingly in a direction facing the fixed detecting unit (73a), an urging unit (79a) urging the movable detecting unit (72a) in a direction separating from the fixed detecting unit (73a), a pressing member (74a) arranged between the fixed detecting unit (73a) and the movable detecting unit (72a) and pressable by the hand of the examinee, and an interlock mechanism (77a) moving the movable detecting unit (72a) against the urging force of the urging unit (79a) in a direction approaching the fixed detecting unit (73a) according to the amount of pressing of the pressing member (74a).

4 Claims, 8 Drawing Sheets

RADIATION MONITOR AND HAND-FOOT CLOTH MONITOR INCLUDING HAND MONITORING UNIT

RELATED APPLICATIONS

The present application is National Phase of International Application No. PCT/JP2010/068597 filed Oct. 21, 2010.

TECHNICAL FIELD

The present invention relates to a radiation monitor including a hand monitoring unit that measures surface contamination due to a radioactive material adhering to the surface of the hand of the examinee and a hand-foot-cloth monitor that measures, the surface contamination of the hand, foot, and clothes.

BACKGROUND ART

In recent years, a radiation monitor has been proposed which is provided in facilities that treat a radioactive material, such as nuclear power plants and hospitals, and measures surface contamination due to a radioactive material adhering to the hand, foot, and clothes of the worker in the facilities. The radiation monitor measures radiation emitted from the radioactive material, sounds the alarm when the measured value is more than a warning level, and displays a contaminated part on a liquid crystal display.

In the radiation monitor, a hand monitoring unit is provided with a hand insertion portion into which the hand of the examinee is inserted and a pair of radiation detecting units is provided on the side surfaces of the hand insertion portion that face each other. The surface contamination of the hand can be measured as follows. The examinee opens the left and right hands and inserts the hands into the hand insertion portions. Then, radiation that is emitted from the radioactive material adhered to the surface of each of the palm and back of the hand of the surface is detected (for example, see Patent Document 1).

CITATION LIST

Patent Document

Patent Document 1: Japanese Patent Application Laid-Open No. 2003-167059

DISCLOSURE OF INVENTION

Problem to be Solved by the Invention

However, in the hand monitoring unit according to the related art, the width of the hand insertion portion is fixed to the assumed maximum value of the size (thickness) of the hand of the examinee. Therefore, the accuracy of measurement varies depending on the size of the hand. That is an α ray, which is one kind of radiation, and has a short path length in air. Therefore, when the size of the hand of the examinee is large, the accuracy of measurement increases since both the palm and back of the hand are close to the radiation detecting unit. However, when the size of the hand of the examinee is small, the accuracy of measurement is reduced since the palm of the hand or the back of the hand is away from the radiation detecting unit.

The invention has been made in view of the above-mentioned problems, and an object of the invention is to provide a radiation monitor and a hand-foot-cloth monitor including a hand monitoring unit capable of accurately measuring surface contamination regardless of the size of the hand of the examinee.

Means for Solving the Problem

According to an aspect of the invention, a radiation monitor includes a pair of hand monitoring units each of which includes a fixed detecting unit and a movable detecting unit that is provided so as to face the fixed detecting unit and can be reciprocated in a direction facing the fixed detecting unit and into which an examinee inserts the hands with one of the palm and back of the hand facing the fixed detecting unit and the other facing the movable detecting unit; an urging unit that urges the movable detecting unit in a direction in which the movable detecting unit is separated from the fixed detecting unit; a pressing member that is provided between the fixed detecting unit and the movable detecting unit and is pressed by the hand of the examinee; and an interlock mechanism that moves the movable detecting unit against the urging force of the urging unit in a direction in which the movable detecting unit approaches the fixed detecting unit according to the amount of pressing of the pressing member.

According to the radiation monitor, when the examinee inserts the hand into the hand monitoring unit and presses the pressing member with the hand in order to measure the surface contamination of the hand, the movable detecting unit is moved in a direction in which it approaches the fixed detecting unit according to the amount of pressing of the pressing member. Therefore, it is possible to adjust the gap between the movable detecting unit and the fixed detecting unit according to the size of the hand of the examinee. As a result, it is possible to arrange the fixed detecting unit and the movable detecting unit so as to be close to the palm and back of the hand according to the size of the hand of the examinee, under any size of the hand. Therefore, it is possible to accurately measure surface contamination.

Advantages of the Invention

According to the invention, it is possible to provide a radiation monitor and a hand-foot-cloth monitor including a hand monitoring unit capable of accurately measuring surface contamination regardless of the size of the hand of the examinee.

BEST MODE FOR CARRYING OUT THE INVENTION

First Embodiment

Hereinafter, a present embodiment of the invention will be described in detail with reference to the accompanying drawings.

In this embodiment, a hand-foot-cloth monitor including a foot monitoring unit and a cloth monitoring unit in addition to a hand monitoring unit will be described. However, this embodiment can also be applied to a radiation monitor without the foot monitoring unit and the cloth monitoring unit.

Figure 1:
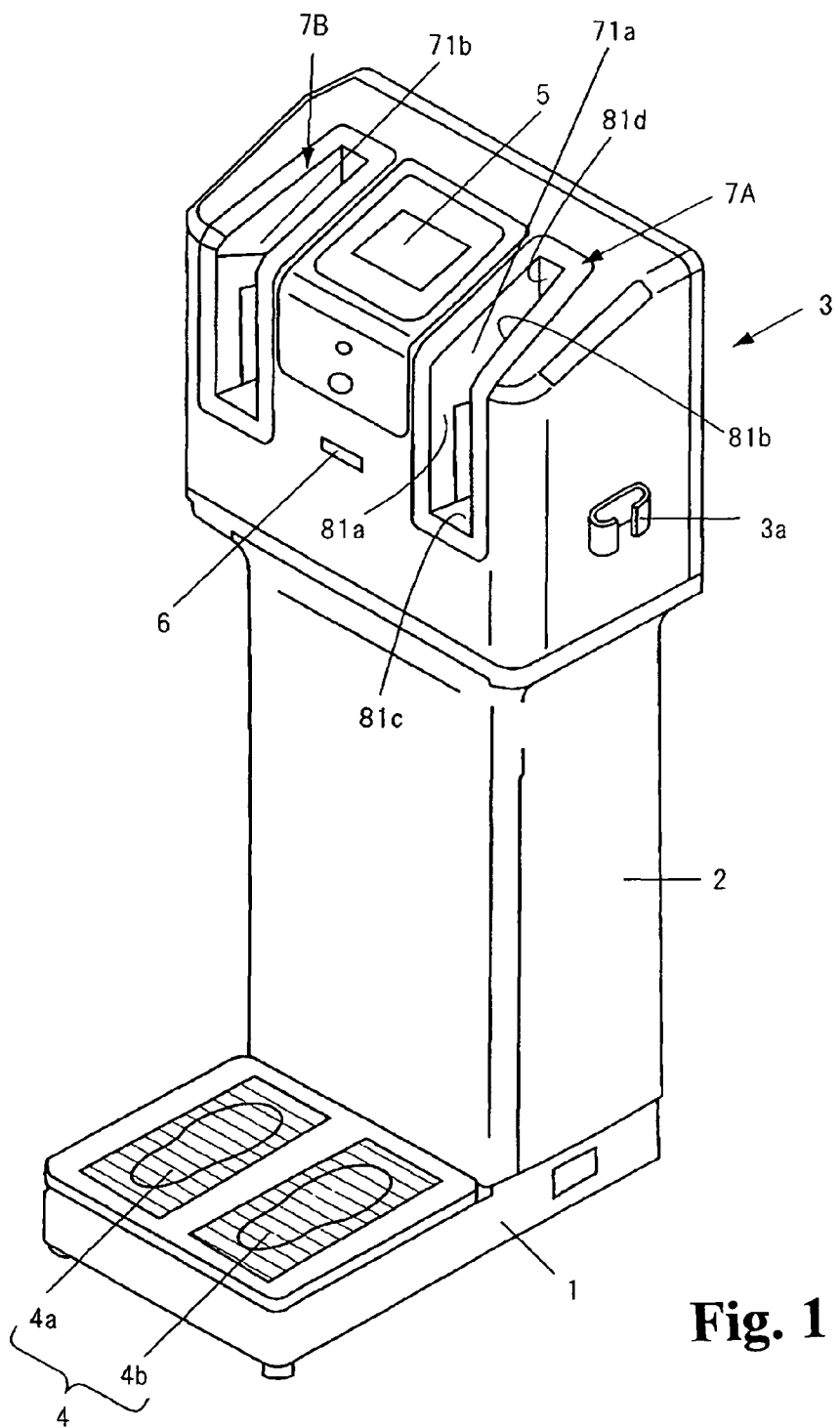
FIG. 1 is a perspective view showing the overall structure of a hand-foot-cloth monitor including a hand monitoring unit according to a first embodiment of the invention.
Figure 2B:
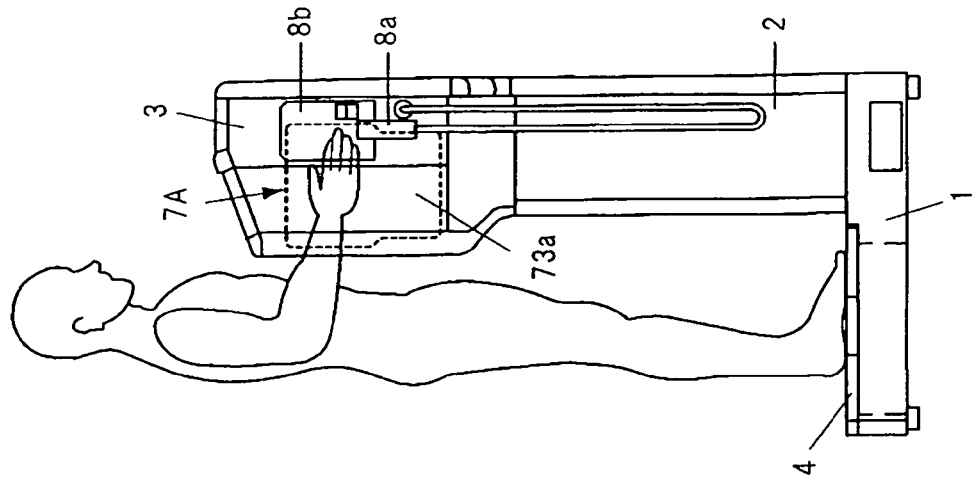
FIG. 2(b) is a right side view showing the usage of the hand-foot-cloth monitor.
Figure 2A:
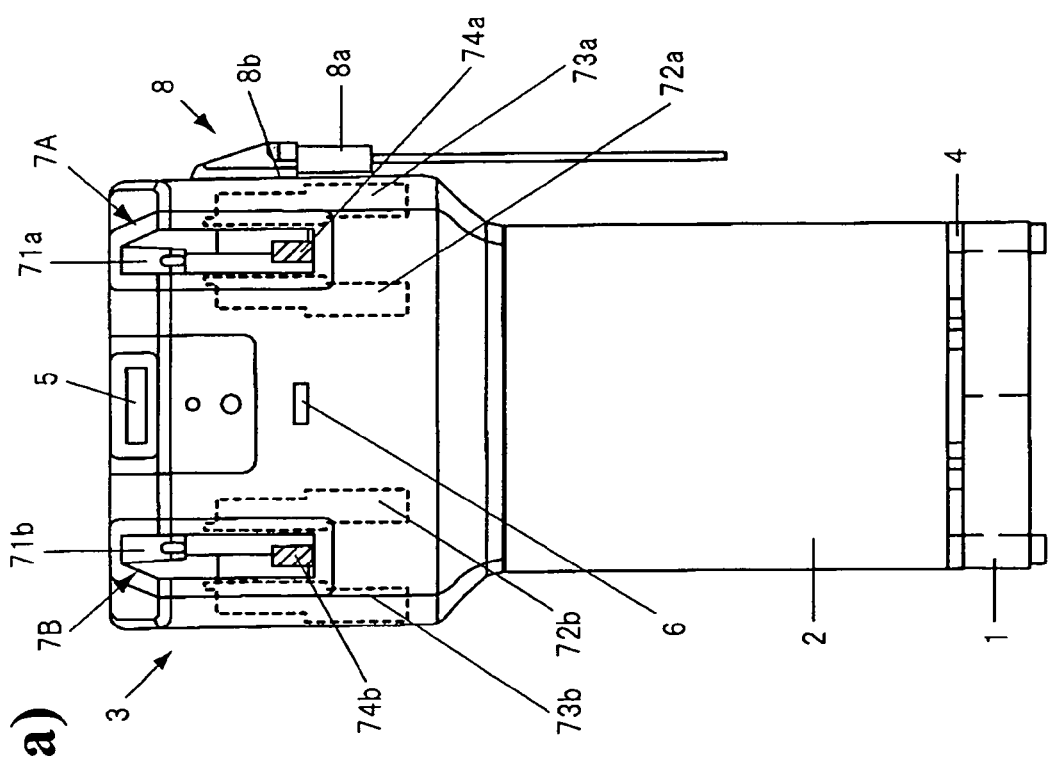
FIG. 2(a) is a front view showing the hand-foot-cloth monitor according to the first embodiment.
Figure 3:
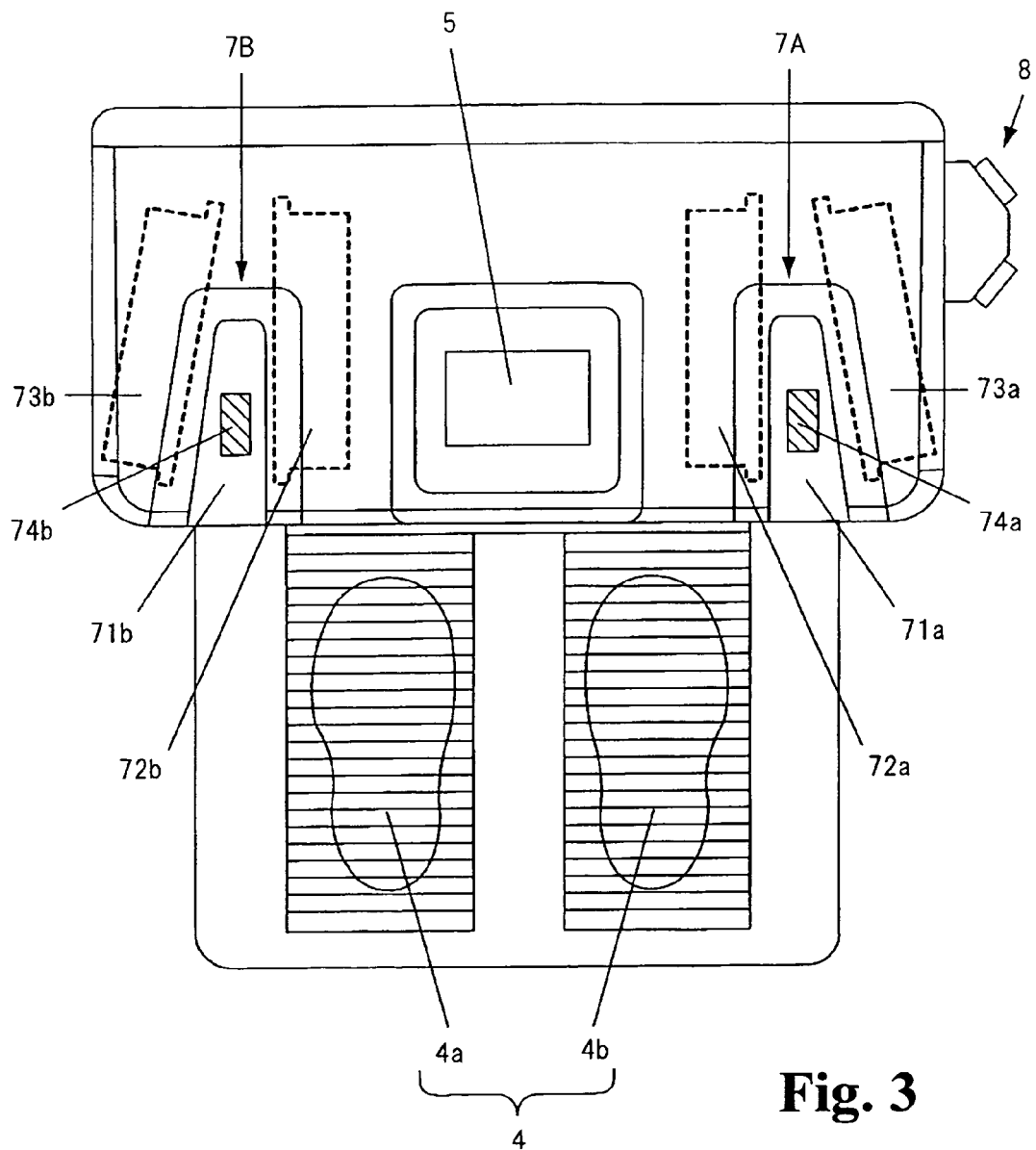
FIG. 3 is a top view showing the hand-foot-cloth monitor according to the first embodiment.

FIGS. 1 to 3 are diagrams illustrating the overall structure of the hand-foot-cloth monitor including the hand monitoring unit according to the first embodiment. FIG. 1 is a perspective view illustrating the overall structure of the hand-foot-cloth monitor according to the first embodiment. FIG. 2(a) is a front view illustrating the hand-foot-cloth monitor and FIG. 2(b) is a right view illustrating the usage of the hand-foot-cloth monitor. FIG. 3 is a top view illustrating the hand-foot-cloth monitor.

The hand-foot-cloth monitor according to the first embodiment includes a base 1, which is a footboard for an examinee, a box-shaped column 2 that is vertically provided on the rear side of the upper surface of the base 1, and an upper unit 3 that is fixed to the upper end of the column 2.

As shown in FIG. 1, a foot monitoring unit 4 is provided on the front side of the upper surface, which is a footboard portion of the base 1. The foot monitoring unit 4 includes a pair of left and right radiation detecting units 4a and 4b. Foot-shaped marks indicating the positions where the feet of the examinee are placed are provided on the upper surfaces of the radiation detecting units 4a and 4b.

A display unit 5 that displays the measurement result of radiation for each part of the examinee is provided at the center of the upper surface of the upper unit 3. A buzzer 6 that makes a buzzing sound on the basis of the measurement result of radiation is provided on the front side of the upper unit 3. A hook 3a that can hold a cloth monitoring unit 8 (for example, see FIG. 2) not shown in FIG. 1 is provided on one side of the upper unit 3.

In the first embodiment, the upper unit 3 includes a pair of left and right hand monitoring units 7A and 7B provided on both sides of the display unit 5. The hand monitoring unit 7A is surrounded by left and right side walls 81a and 81b, the bottom 81c, and a rear wall 81d and has a hand insertion space with the upper surface and the front side opened. The right hand of the examinee is inserted into the hand insertion space. The examinee inserts the right hand into the hand insertion space of a hand insertion portion 71a from the front and upper sides of the hand monitoring unit 7A. Similarly, the hand monitoring unit 7B is provided with a hand insertion portion 71b and the left hand of the examinee is inserted into the hand insertion space of the hand insertion portion 71b.

As shown in FIG. 2(a), the main parts of the pair of left and right side walls 81a and 81b facing each other in the hand insertion portion 71a of the hand monitoring unit 7A include a movable detecting unit 72a and a fixed detecting unit 73a which are radiation detecting units. A portion of a pressing member 74a is exposed from the bottom 81c of the hand insertion portion 71a. Similarly, in the hand monitoring unit 7B, the main parts of the left and right side walls of the hand insertion portion 71b include a movable detecting unit 72b and a fixed detecting unit 73b and a portion of a pressing member 74b is exposed from the bottom 81c.

As shown in FIG. 2(b), the hand monitoring unit 7A is provided at a height where the examinee stands upright on the foot monitoring unit 4, bends the arm, opens the right hand, and inserts the right hand into the hand insertion portion 71a with a little finger downward and the thumb upward.

As shown in FIG. 3, in the hand monitoring unit 7A, the fixed detecting unit 73a is inclined with respect to the movable detecting unit 72a such that the gap between the rear side of the fixed detecting unit 73a and the movable detecting unit 72a is small and the gap between the front side thereof and the movable detecting unit 72a is the maximum. That is, the hand insertion portion 71a is configured so as to have a large opening. A portion of the pressing member 74a is arranged in the middle of the hand insertion portion 71a in the depth direction and can be pressed by the side surface of a portion of the inserted right hand from the base of the little finger to the wrist.

The cloth monitoring unit 8 is removably held by the hook 3a that is provided on one side of the upper unit 3. The cloth monitoring unit 8 includes a holding hand 8a used by the examinee to hold the cloth monitoring unit 8 and a radiation detecting unit 8b that is attached to the leading end of the holding hand 8a.

The radiation detecting units 4a, 72a, 72b, 73a, 73b, and 8b of the hand-foot-cloth monitor detect radiation ($\alpha$ rays, $\beta$ rays, and $\gamma$ rays) emitted from a radioactive material adhered to the hand and foot of the examinee and the surface of the clothes of the examinee.

Figure 4:
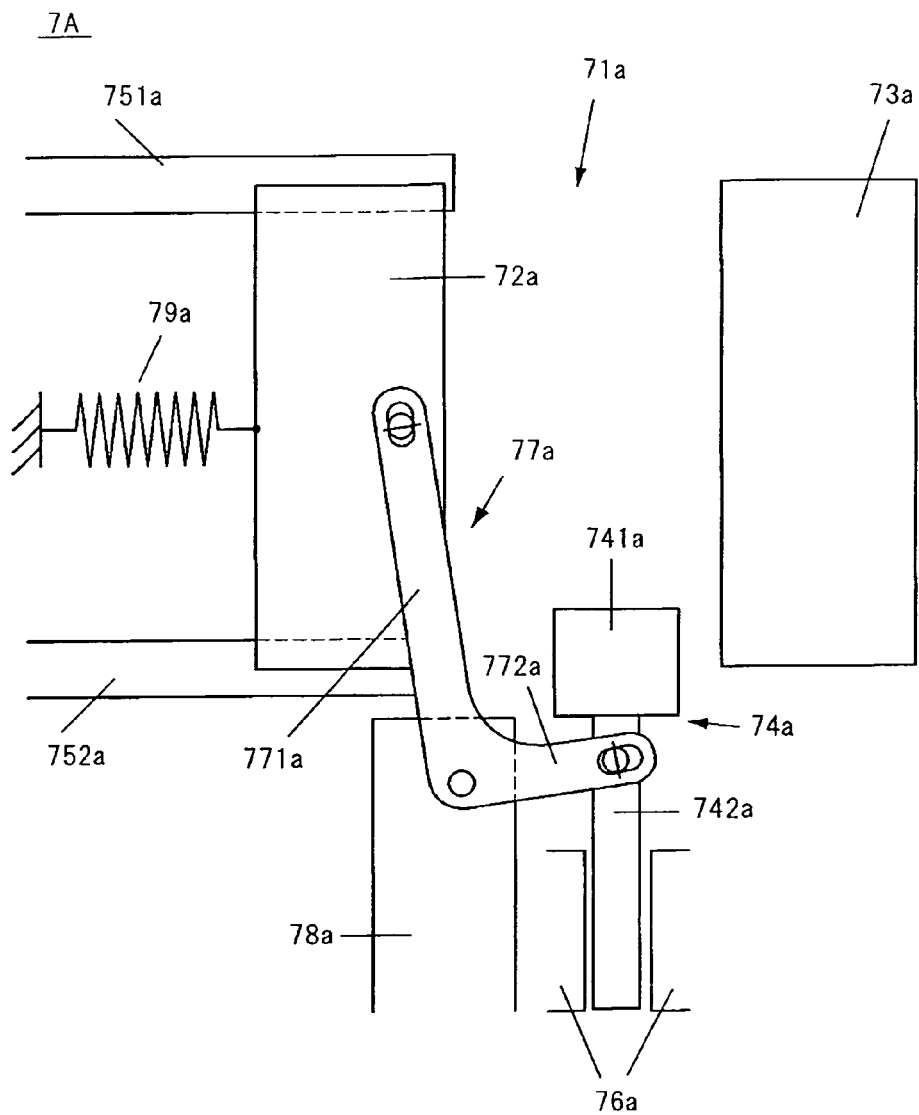
FIG. 4 is a diagram showing the construction principle of the hand monitoring unit according to the first embodiment.

Next, the structure of the hand monitoring unit 7A according to this embodiment will be described with reference to FIG. 4. FIG. 4 is a diagram illustrating the construction principle of the hand monitoring unit 7A. FIG. 4 shows the right hand monitoring unit 7A, as viewed from the front side. In the hand insertion portion 71a, the movable detecting unit 72a and the fixed detecting unit 73a are arranged so as to face each other and form the left and right side walls 81a and 81b. The movable detecting unit 72a is slidably supported by a pair of upper and lower guide rails 751a and 752a such that it can approach or retreat from the fixed detecting unit 73a. The fixed detecting unit 73a is fixed to the upper unit 3.

The pressing member 74a including a button 741a and a shaft portion 742a connected to the button 741a is arranged between the movable detecting unit 72a and the fixed detecting unit 73a. The shaft portion 742a is supported by a shaft guide 76a such that it can be moved in the vertical direction. In this way, the shaft portion 742a can rise from the bottom 81c of the hand insertion portion 71a and can be pressed to the bottom 81c.

An L-shaped link 77a includes a longitudinal portion 771a and a lateral portion 772a. The longitudinal portion 771a is supported by the detecting unit 72a so as to pivot on its end and the lateral portion 772a is supported by the shaft portion 742a so as to pivot on its end. In addition, the L-shaped link 77a is supported by a frame 78a fixed to the upper unit 3 so as to pivot on its corner. The shape of the link is not limited to the L shape, but the link may have any shape as long as it is an interlock mechanism capable of moving the movable detecting unit 72a according to the amount of pressing of the pressing member 74a.

A coil spring 79a has a fixed end that is fixed to the upper unit 3 and a movable end that is connected to the movable detecting unit 72a. The coil spring 79a urges the movable detecting unit 72a so as to be separated from the fixed detecting unit 73a. The urging unit is not limited to the coil spring, but it may be an elastic body capable of urging the movable detecting unit 72a so as to be separated from the fixed detecting unit 73a.

Next, the operation of the hand monitoring unit 7A according to this embodiment when the surface contamination of the hand is measured will be described with reference to FIGS. 5 and 6. FIGS. 5(a) and 5(b) are diagrams illustrating the operation of the hand monitoring unit 7A. FIGS. 6(a) to 6(c) are diagrams illustrating the relationship between the hand monitoring unit and the hand of the examinee.

Figure 5A:
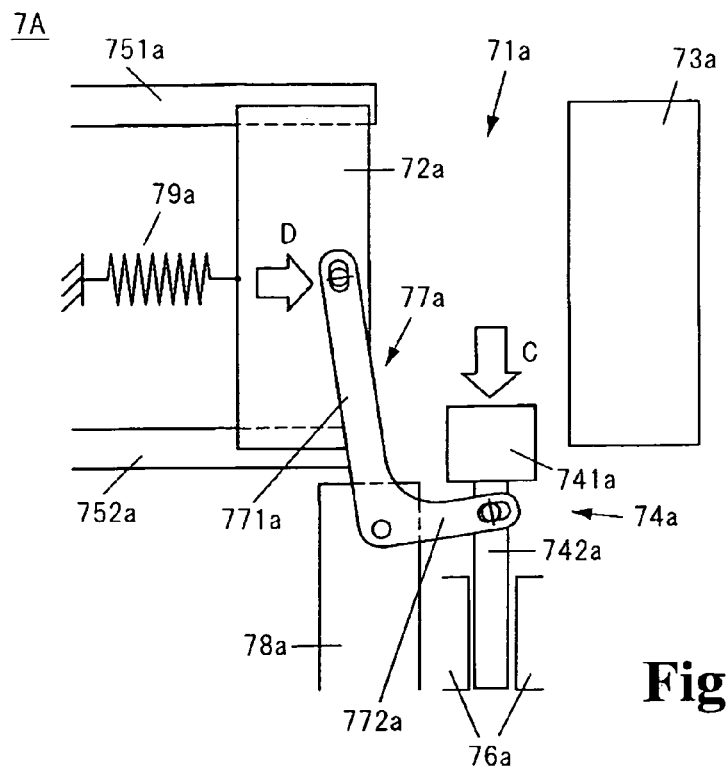
FIGS. 5(a) and 5(b) are diagrams showing the operation of the hand monitoring unit according to the first embodiment.

FIG. 5(a) shows an initial state before the button 741a of the hand monitoring unit 7A is pressed. In the initial state, the pressing member 74a rises from the bottom 81c of the hand insertion portion 71a by a predetermined distance such that the button 741a is exposed from the bottom 81c. The movable detecting unit 72a and the fixed detecting unit 73a have a sufficient gap therebetween to facilitate the insertion of the hand of the examinee regardless of the size of the hand. The hand monitoring unit 7B has the same structure as the hand monitoring unit 7A.

Figure 6A:
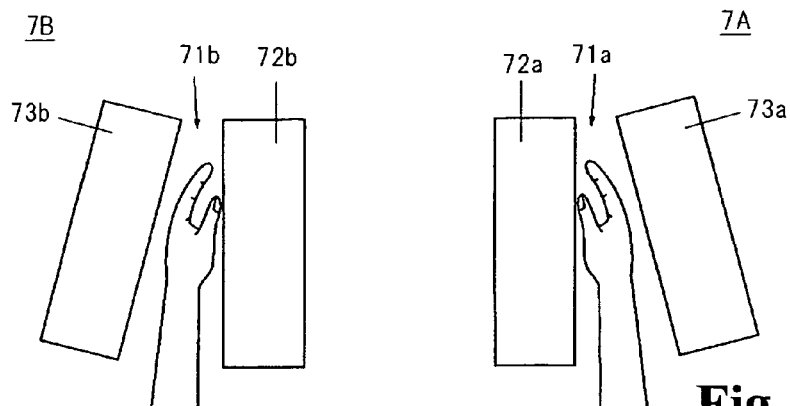
FIGS. 6(a) to 6(c) are diagrams showing the relationship between the hand of the examinee and the hand monitoring unit according to the first embodiment.

FIG. 6(a) shows a state in which the examinee inserts the hands into the hand monitoring units 7A and 7B from the initial state. As shown in FIG. 6(a), the examinee opens the hands and inserts the hands into the hand insertion portions 71a and 71b with the palms of the hands facing the movable detecting units 72a and 72b and the backs of the hands facing the fixed detecting units 73a and 73b. In this case, both the palms and backs of the hands of the examinee are separated from the radiation detecting units (the movable detecting units 72a and 72b and the fixed detecting units 73a and 73b).

Then, the examinee presses the button 741a with the side of the hand in the direction (downward direction) of an arrow C (see FIG. 5(a)). Then, the shaft portion 742a connected to the button 741a is pressed to the bottom 81c of the hand insertion portion 71a along the shaft guide 76a and is moved in the downward direction. With the movement of the shaft portion 742a, the end of the lateral portion 772a of the L-shaped link 77a is moved together with the shaft portion 742a in the downward direction. Then, the L-shaped link 77a is pivoted on its corner in the clockwise direction and the end of the longitudinal portion 771a of the L-shaped link 77a is moved in the right direction. As a result, the movable detecting unit 72a is moved against the coil spring 79a in a direction (the direction of an arrow D) in which it approaches the fixed detecting unit 73a. As the button 741a is further pressed, the movable detecting unit 72a is closer to the fixed detecting unit 73a. Therefore, the examinee can adjust the gap between the movable detecting unit 72a and the fixed detecting unit 73a according to the size of the hand.

Figure 5B:
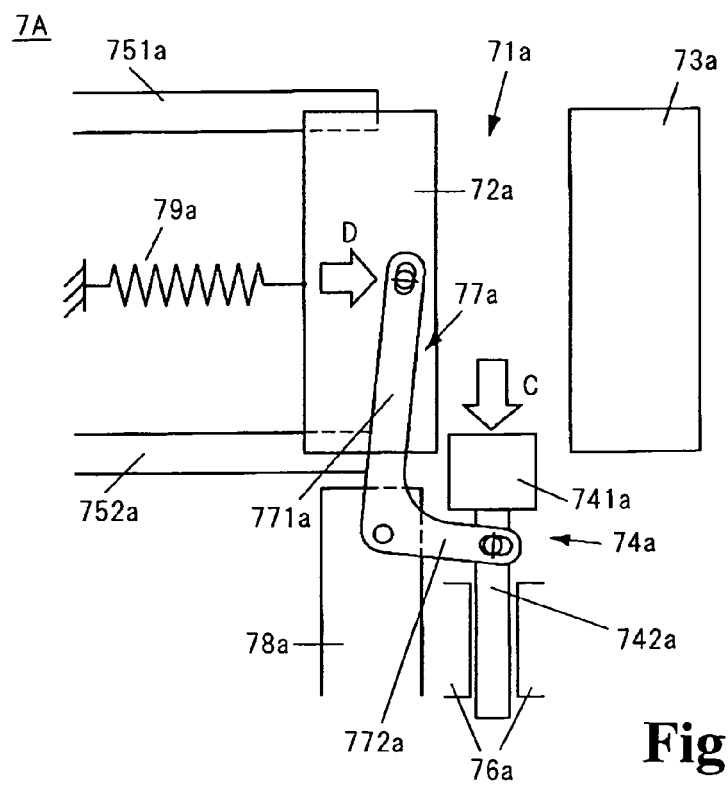

FIG. 5(b) shows the measurement state of the hand monitoring unit 7A. In the measurement state, the pressing member 74a is pressed to the bottom 81c of the hand insertion portion 71a. In the measurement state, the exposure of the button 741a from the bottom 81c is reduced, as compared to the initial state. In addition, the movable detecting unit 72a and the fixed detecting unit 73a are disposed sufficiently close to the hand of the examinee according to the amount of pressing of the pressing member 74a.

Figure 6B:
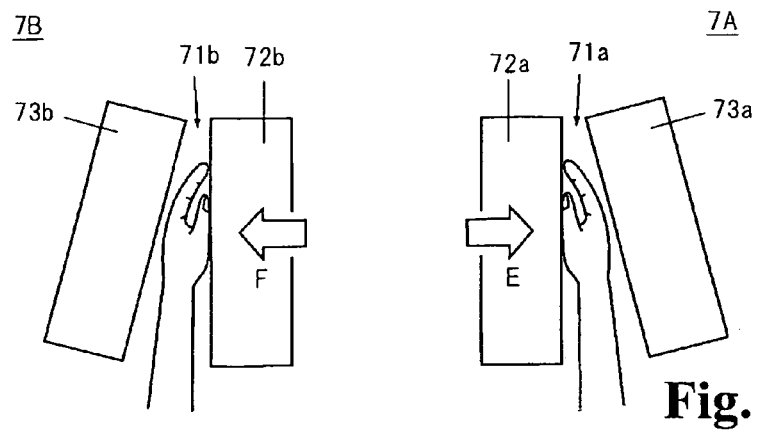

FIG. 6(b) shows the measurement state in which the examinee inserts the hands into the hand monitoring units 7A and 7B. The movable detecting units 72a and 72b are moved in the directions of arrows E and F from the positions in the initial state. In this case, both the palms and backs of the hands of the examinee approach the radiation detecting units (the movable detecting units 72a and 72b and the fixed detecting units 73a and 73b). In particular, since the fixed detecting units 73a and 73b facing the back of the hand are obliquely arranged, they approach the hands in the shape of the hand. As such, both the palm and back of the hand can approach the radiation detecting unit, regardless of the size of the hand of the examinee, and it is possible to detect α rays with a short path length. Therefore, it is possible to prevent a variation in the accuracy of measurement depending on the size of the hand and it is possible to accurately measure surface contamination.

Figure 6C:
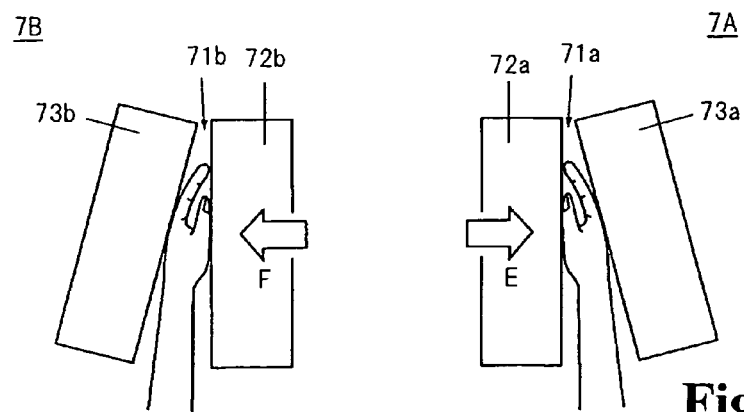

When the button 741a is pressed, it is possible to move the movable detecting unit 72a to the fixed detecting unit 73a until the movable detecting unit 72a and the fixed detecting unit 73a contact the palm and back of the hand of the examinee (see FIG. 6(c)). In this case, similar to the state shown in FIG. 6(b), it is possible to measure surface contamination. In the hand monitoring units 7A and 7B according to this embodiment, the examinee presses the pressing members 74a and 74b to manually adjust the widths of the hand insertion portions 71a and 71b. Therefore, the examinee can adjust the width of the hand insertion portion to a desired value.

When the measurement state is maintained for several seconds and measurement ends, information indicating that the measurement has ended is displayed on the display unit 5 of the upper unit 3. Then, the examinee takes his or her hands out of the hand monitoring units 7A and 7B.

Then, no pressing force is applied to the button 741a of the pressing member 74a and the movable detecting unit 72a is moved in a direction (left direction) in which it is separated from the fixed detecting unit 73a by the restoring of the coil spring 79a to draw the movable detecting unit 72a so as to be separated from the fixed detecting unit 73a. With the movement of the movable detecting unit 72a, the end of the longitudinal portion 771a of the L-shaped link 77a is moved in the left direction. With the movement of the longitudinal portion 771a, the L-shaped link 77a pivots on its corner in the counterclockwise direction and the end of the lateral portion 772a of the L-shaped link 77a is moved in the upward direction. As a result, the shaft portion 742a of the pressing member 74a rises from the bottom 81c of the hand insertion portion 71a and stops at the position which is a predetermined distance away from the bottom 81c by the restoring force of the coil spring 79a. In this way, the movable detecting unit 72a returns to the initial state.

Figure 7:
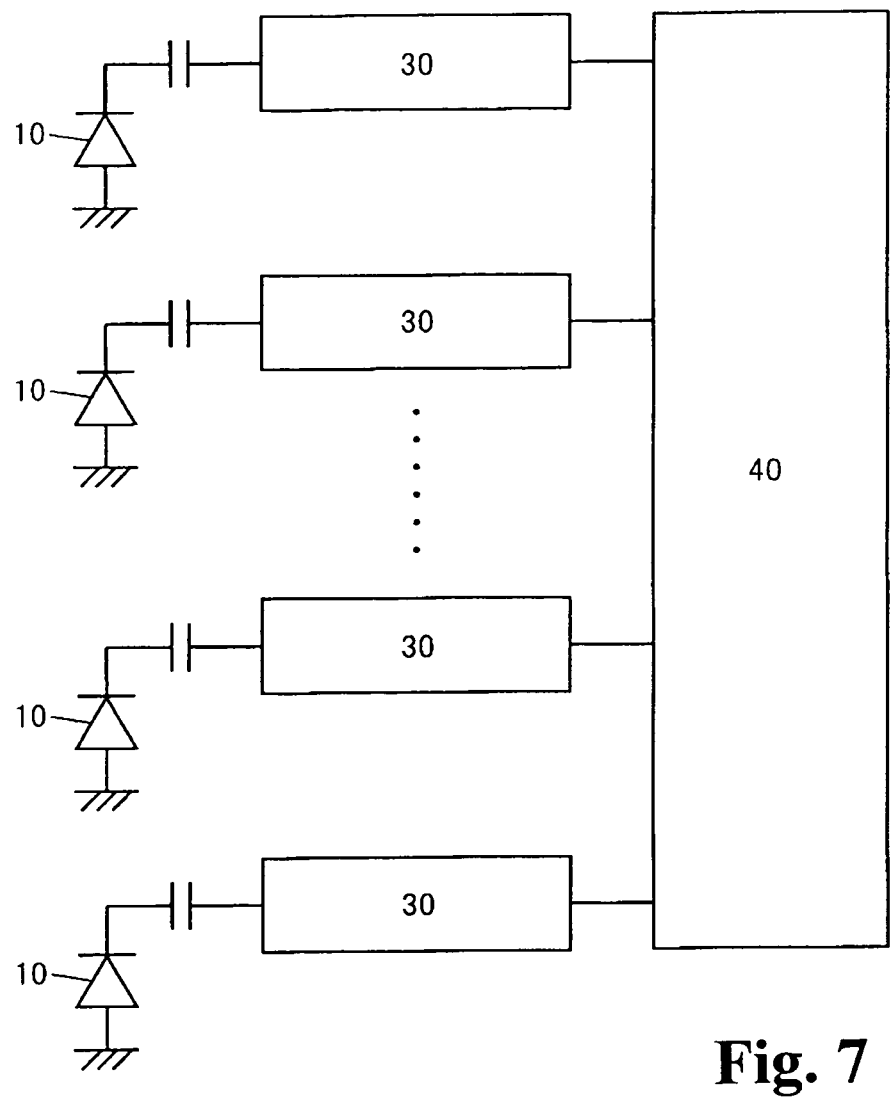
FIG. 7 is a functional block diagram schematically showing an electric system according to the first embodiment.

Next, the outline of an electric system of the hand-foot-cloth monitor according to this embodiment will be described. FIG. 7 is a functional block diagram schematically illustrating the electric system of the radiation detecting unit of the hand-foot-cloth monitor according to this embodiment. For example, the radiation detecting units, such as the movable detecting unit 72a and the fixed detecting unit 73a in the hand monitoring unit 7A, are semiconductor radiation detecting devices and include radiation detecting elements 10 which are made of a semiconductor and are densely arranged in two dimensions. A circuit block shown in FIG. 7 is connected to the radiation detecting unit. That is, a signal processing unit 30 is provided for each radiation detecting element 10 and each signal processing unit 30 is connected to a microprocessor (MPU) 40.

Each signal processing unit 30 amplifies a signal output from the radiation detecting element 10. The MPU 40 detects the signal amplified by each signal processing unit 30, counts the detected signals, and calculates the amount of radiation on the basis of the count result. When the calculated amount of radiation is more than a predetermined value, the MPU controls the buzzer 6 to sound the alarm and controls the display unit 5 to display a warning message on a contamination part in which the calculated amount of radiation is more than the predetermined value. The MPU 40 can control the count range of the detected signal from the radiation detecting element 10 to specify a detailed contamination part.

The measurement of surface contamination in the hand monitoring unit 7A starts in operative association with the adjustment of the opening of the radiation detecting unit during measurement. For example, a structure in which, when the examinee inserts the hand into the hand insertion portion 71a of the hand monitoring unit 7A and light emitted to the button 741a is shielded by the hand, a photoelectric sensor (not shown) provided in the hand monitoring unit 7A detects a variation in the amount of light, which starts the measurement, may be used as an interlock switch. Alternatively, a structure in which the little finger touches a mechanical switch (not shown) provided in the hand monitoring unit 7A when the examinee presses the button 741a and starts the measurement may be used as the interlock switch.

As described above, according to the hand monitoring unit 7A of the first embodiment, when the hand is inserted into the hand monitoring unit 7A to measure the surface contamination of the hand and the examinee presses the pressing member 74a, the L-shaped link 77a serving as an interlock mechanism moves the movable detecting unit 72a in a direction in which the movable detecting unit 72a approaches the fixed detecting unit 73a according to the amount of pressing of the pressing member 74a. Therefore, it is possible to adjust the gap between the movable detecting unit 72a and the fixed detecting unit 73a according to the size of the hand of the examinee. As a result, it is possible to accurately measure surface contamination regardless of the size of the hand.

Second Embodiment

A hand monitoring unit 70A having a structure different from that of the hand monitoring unit 7A according to the first embodiment will be described. In the hand monitoring unit 7A according to the first embodiment, the L-shaped link 77a transmits the amount of pressing of the pressing member 74a by the examinee to the movable detecting unit 72a, thereby moving the movable detecting unit 72a. In contrast, the hand monitoring unit 70A according to the second embodiment differs from the hand monitoring unit 7A according to the first embodiment in that the amount of pressing of the button 741a by the examinee is transmitted to the movable detecting unit 72a by expansion pumps 70a and 70b.

Figure 8A:
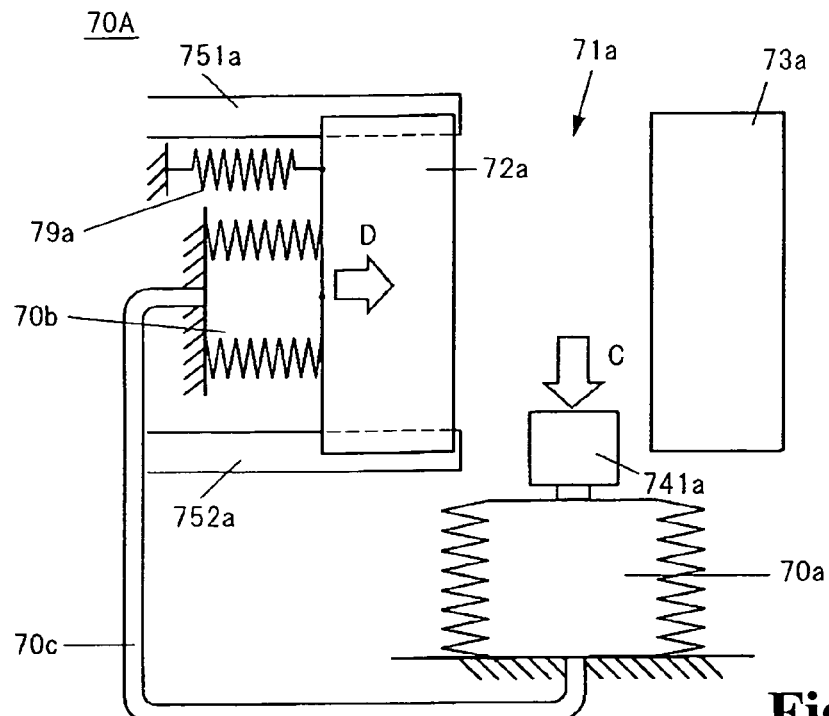
FIGS. 8(a) and 8(b) are diagrams showing the operation of a hand monitoring unit according to a second embodiment of the invention.
Figure 8B:
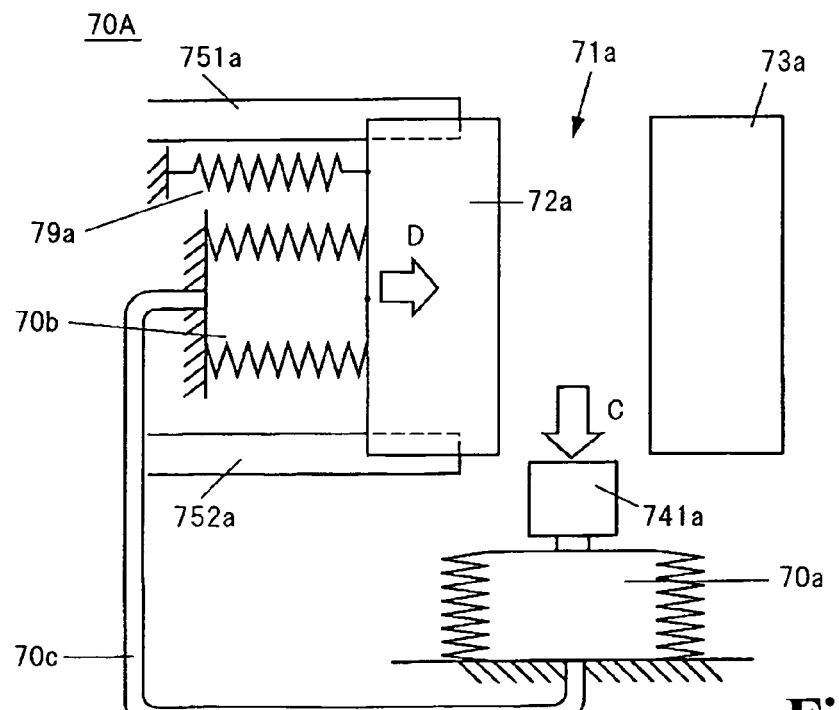

The structure of the hand monitoring unit 70A according to the second embodiment will be described with reference to FIGS. 8(a) and 8(b). FIGS. 8(a) and 8(b) are diagrams illustrating the operation of the hand monitoring unit 70A according to the second embodiment. In FIGS. 8(a) and 8(b), the same components as those shown in FIGS. 5(a) and 5(b) are denoted by the same reference numerals and a description thereof will be omitted. The hand monitoring unit 70A differs from the hand monitoring unit 7A according to the first embodiment in that the interlock mechanism is formed by the expansion pumps 70a and 70b.

The expansion pump 70a includes, for example, a cylindrical bellows portion that is made of a resin and is extendable. The button 741a of the pressing member is attached to one end of the expansion pump 70a and the upper unit 3 is fixed to the other end of the expansion pump 70a. In addition, a connection pipe 70c communicating with the expansion pump 70b is attached to the other end of the expansion pump 70a. When the button 741a is pressed in the direction (downward direction) of an arrow C, the bellows portion of the expansion pump 70a is contacted and a fluid flows from the expansion pump 70a to the connection pipe 70c. When the button 741a returns in a direction (upward direction) opposite to the arrow C, the bellows portion of the expansion pump 70a is expanded and a fluid flows into the expansion pump 70a from the connection pipe 70c.

The expansion pump 70b includes a cylindrical bellows portion that is made of, for example, a resin and is expandable. The expansion pump 70b is arranged such that one end thereof comes into contact with the movable detecting unit 72a and the other end is fixed to the upper unit 3. A connection pipe 70c communicating with the expansion pump 70a is attached to the other end of the expansion pump 70b.

Since the ratio of the diameter of the expansion pump 70a to the diameter of the expansion pump 70b is about 2:1, the expansion ratio of the pumps is about 1:2. Therefore, the expansion and contraction efficiency of the expansion pump 70b is more than that of the expansion pump 70a. In this embodiment, the expansion pump has the bellows portion, but the invention is not limited thereto. For example, the expansion pump may include a spherical rubber ball.

Next, the operation of the hand monitoring unit 70A according to this embodiment when the surface contamination of the hand is measured will be described. FIG. 8(a) shows an initial state before the button 741a of the hand monitoring unit 70A is pressed. In the initial state, the button 741a rises from the bottom 81c of the hand insertion portion 71a by a predetermined distance such that the button 741a is exposed from the bottom 81c. The movable detecting unit 72a and the fixed detecting unit 73a have a sufficient gap therebetween to facilitate the insertion of the hand of the examinee regardless of the size of the hand.

The examinee opens the hands and inserts the hands into the hand insertion portion 71a with the palm of the hand facing the movable detecting unit 72a and the back of the hand facing the fixed detecting unit 73a. Then, the examinee presses the button 741a with the side of the hand in the direction (downward direction) of the arrow C. Then, with the pressing of the button 741a, the bellows portion of the expansion pump 70a is contracted and a fluid flows to the connection pipe 70c. Then, the fluid flows from the connection pipe 70c to the expansion pump 70b and the bellows portion of the expansion pump 70b is expanded. As a result, the movable detecting unit 72a is moved against the coil spring 79a in a direction (the direction of an arrow D) in which it approaches the fixed detecting unit 73a. Since the expansion ratio of the expansion pump 70b is higher than that of the expansion pump 70a, the expansion length of the bellows portion of the expansion pump 70b is more than the displacement of the button 741a (the expansion length of the bellows portion of the expansion pump 70a).

FIG. 8(b) shows the measurement state of the hand monitoring unit 70A. In the measurement state, the button 741a is pressed to the bottom 81c of the hand insertion portion 71a. In the measurement state, the exposure of the button 741a from the bottom 81c is reduced, as compared to the initial state. In addition, the movable detecting unit 72a and the fixed detecting unit 73a are disposed sufficiently close to the hand of the examinee. In this case, both the palm and back of the hand of the examinee are close to the radiation detecting units (the movable detecting unit 72a and the fixed detecting unit 73a). Therefore, it is possible to detect α rays with a short path length. In addition, it is possible to prevent a disparity in the accuracy of measurement depending on the size of the hand and accurately measure surface contamination.

When measurement ends, the examinee takes his or her hand out of the hand monitoring unit 70A. Then, no pressing force is applied to the button 741a and the movable detecting unit 72a is moved in a direction (left direction) in which it is separated from the fixed detecting unit 73a by the restoring force of the coil spring 79*a* to draw the movable detecting unit 72*a* so as to be separated from the fixed detecting unit 73*a*. With the movement of the movable detecting unit 72*a*, the bellows portion of the expansion pump 70*b* is contracted and a fluid flows to the connection pipe 70*c*. Then, the fluid flows into the expansion pump 70*a* from the connection pipe 70*c* and the bellows portion is expanded. As a result, the button 741*a* is moved in the upward direction and stops at a position which is a predetermined distance away from the bottom 81*c* by the restoring force of the coil spring 79*a*. In this way, the hand monitoring unit returns to the initial state.

As described above, according to the hand monitoring unit 70A of the second embodiment, when the examinee inserts the hand into the hand monitoring unit 70A in order to measure the surface contamination of the hand and presses the button 741*a* as a pressing member, the expansion pumps 70*a* and 70*b* serving as an interlock mechanism move the movable detecting unit 72*a* in a direction in which the movable detecting unit 72*a* approaches the fixed detecting unit 73*a* according to the amount of pressing of the button 741*a*. It is possible to adjust the gap between the movable detecting unit 72*a* and the fixed detecting unit 73*a* according to the size of the hand of the examinee. As a result, it is possible to accurately measure surface contamination regardless of the size of the hand.

The invention is not limited to the above-described embodiments, but various modifications of the invention can be made. In the above-described embodiments, for example, the sizes or shapes of the components are not limited to those shown in the accompanying drawings, but can be appropriately changed within the range capable of obtaining the effect of the invention. In addition, various modifications and changes of the invention can be made without departing from the scope and spirit of the invention.

What is claimed is:

1. A radiation monitor comprising:
   a pair of hand monitoring units, each having a fixed detecting unit and a movable detecting unit arranged to face against the fixed detecting unit and to be movable reciprocatingly in a direction facing the fixed detecting unit, the hand monitoring units being adapted to receive a hand of an examinee with one of a palm or back of the hand facing the fixed detecting unit and the other facing the movable detecting unit;
   an urging unit urging the movable detecting unit in a direction separating the movable detecting unit from the fixed detecting unit;
   a pressing member arranged between the fixed detecting unit and the movable detecting unit, the pressing member being pressable by the hand of the examinee; and
   an interlock mechanism moving the movable detecting unit against an urging force of the urging unit in a direction approaching the fixed detecting unit according to an amount of pressing of the pressing member.

2. The radiation monitor according to claim 1, wherein the interlock mechanism has an L-shaped link having one end supported rotatably by the pressing member, the other end supported rotatably by the movable detecting unit, and an intermediate corner supported rotatably by a monitor body.

3. The radiation monitor according to claim 1, wherein the interlock mechanism comprises:
   a first elastic body expandable and contractible by flow of a fluid;
   a second elastic body expandable and contractible by the flow of the fluid; and
   a connection pipe connecting the first elastic body and the second elastic body,
   wherein the fluid flows from the first elastic body to the second elastic body by the pressing member to expand the second elastic body.

4. A hand-foot-cloth monitor comprising:
   a hand monitoring unit detecting a surface contamination of a hand of an examinee;
   a foot monitoring unit detecting a surface contamination of a foot of the examinee; and
   a cloth monitoring unit detecting a surface contamination of clothes of the examinee;
   wherein the hand monitoring unit includes:
   a fixed detecting unit and a movable detecting unit arranged to face the fixed detecting unit and movable reciprocatingly in a direction facing the fixed detecting unit;
   an urging unit urging the movable detecting unit in a direction separating from the fixed detecting unit;
   a pressing member arranged between the fixed detecting unit and the movable detecting unit, and pressable by the hand of the examinee; and
   an interlock mechanism moving the movable detecting unit against an urging force of the urging unit in a direction approaching the fixed detecting unit according to an amount of pressing of the pressing member.

* * * * *

UNITED STATES PATENT AND TRADEMARK OFFICE
CERTIFICATE OF CORRECTION

PATENT NO. : 8,519,352 B1  
APPLICATION NO. : 13/138550  
DATED : August 27, 2013  
INVENTOR(S) : Tadao Hashimoto et al.

Page 1 of 1

It is certified that error appears in the above-identified patent and that said Letters Patent is hereby corrected as shown below:

In the Specification

Change column 6, line 63, "the MPU" to --the MPU40--.

Signed and Sealed this  
Fourth Day of February, 2014

Michelle K. Lee  
*Deputy Director of the United States Patent and Trademark Office*